United States Patent
Bernard, III et al.

(10) Patent No.: US 10,604,350 B1
(45) Date of Patent: Mar. 31, 2020

(54) SYSTEM FOR CONTROLLING TORQUE-LIMITING DRIVE CHARGE CAR

(71) Applicant: Surface Combustion, Inc., Maumee, OH (US)

(72) Inventors: William J. Bernard, III, Maumee, OH (US); Joseph T. McCormick, Maumee, OH (US); Mark Stender, Maumee, OH (US)

(73) Assignee: Surface Combustion, Inc., Maumee, OH (US)

(*) Notice: Subject to any disclaimer, the term of this patent is extended or adjusted under 35 U.S.C. 154(b) by 987 days.

(21) Appl. No.: 14/924,554

(22) Filed: Oct. 27, 2015

Related U.S. Application Data

(60) Provisional application No. 62/068,909, filed on Oct. 27, 2014.

(51) Int. Cl.
*B65G 35/06* (2006.01)
*G05B 19/05* (2006.01)

(52) U.S. Cl.
CPC ............ *B65G 35/06* (2013.01); *G05B 19/05* (2013.01); *G05B 2219/13144* (2013.01)

(58) Field of Classification Search
CPC .................. B65G 35/06; G05B 19/05; G05B 2219/13144
See application file for complete search history.

(56) References Cited

U.S. PATENT DOCUMENTS

| | | | | |
|---|---|---|---|---|
| 2,842,352 A * | 7/1958 | Tauber | .................. | C21D 9/0018 266/132 |
| 2,965,369 A * | 12/1960 | Acker | .................. | C21D 9/0018 134/165 |
| 3,659,831 A * | 5/1972 | Reber | ...................... | C21D 1/63 266/132 |
| 4,133,667 A * | 1/1979 | Nitschke | .............. | B65G 13/071 198/790 |
| 4,974,520 A * | 12/1990 | Dehne | ....................... | B61B 3/02 104/122 |
| 5,479,437 A * | 12/1995 | Hayashi | .................. | F27B 14/08 373/145 |
| 5,496,450 A * | 3/1996 | Blumenthal | ............ | F23N 5/006 110/185 |
| 5,800,774 A * | 9/1998 | Willett | ................. | C21D 9/0018 266/105 |

(Continued)

OTHER PUBLICATIONS

Wayback machine, "Standard Process Control Equipment", https://web.archive.org/web/20111019210636/http://www.surfacecombustion.com:80/products/standard-process-control-equipment, Jul. 19, 2011, pp. 3. (Year: 2011).*

(Continued)

*Primary Examiner* — Rocio Del Mar Perez-Velez
*Assistant Examiner* — Olvin Lopez Alvarez
(74) *Attorney, Agent, or Firm* — MacMillan, Sobanski & Todd, LLC

(57) ABSTRACT

A load-moving system and a method for controlling the load-moving system for a heat treating furnace are described where the method includes detecting and transmitting signals and positions of the load-moving system as the load-moving system traverses a plurality of positions into, in, and out of the heat treating furnace. The signals being detected include one or more of: current, torque, or power used by the load-moving system at a determined position and/or time.

20 Claims, 19 Drawing Sheets

(56) References Cited

U.S. PATENT DOCUMENTS

| | | | |
|---|---|---|---|
| 7,020,569 B2* | 3/2006 | Cao | G05B 23/0213 |
| | | | 702/108 |
| 8,662,888 B2 | 3/2014 | Moller et al. | |
| 9,513,617 B2* | 12/2016 | Pierce | G05B 19/054 |
| 2002/0044284 A1* | 4/2002 | Webb | G01B 21/047 |
| | | | 356/399 |
| 2003/0055666 A1* | 3/2003 | Roddy | B61L 27/0094 |
| | | | 705/305 |
| 2003/0216889 A1* | 11/2003 | Marko | G07C 5/008 |
| | | | 702/182 |
| 2005/0081410 A1* | 4/2005 | Furem | E02F 9/267 |
| | | | 37/379 |
| 2006/0091589 A1* | 5/2006 | Chiu | F27B 17/0025 |
| | | | 266/87 |
| 2006/0173646 A1* | 8/2006 | Tanaka | C03B 29/08 |
| | | | 702/130 |
| 2006/0175153 A1* | 8/2006 | Hubbard | B66B 5/0018 |
| | | | 188/1.11 E |
| 2006/0275719 A1* | 12/2006 | Hill | F23N 5/20 |
| | | | 431/24 |
| 2008/0133051 A1* | 6/2008 | Wallace | B65G 43/00 |
| | | | 700/230 |
| 2008/0183404 A1* | 7/2008 | Emami | G01R 31/024 |
| | | | 702/34 |
| 2009/0231147 A1* | 9/2009 | Peck | G01K 3/04 |
| | | | 340/588 |
| 2010/0299119 A1* | 11/2010 | Erikson | E21B 43/01 |
| | | | 703/6 |
| 2013/0013138 A1* | 1/2013 | Lu | B60L 3/0061 |
| | | | 701/22 |
| 2013/0209947 A1* | 8/2013 | Moller | C21D 9/0018 |
| | | | 432/1 |
| 2013/0228419 A1* | 9/2013 | Baek, IV | B65G 21/14 |
| | | | 198/615 |
| 2015/0170090 A1* | 6/2015 | Bose | G06Q 10/06395 |
| | | | 705/7.41 |
| 2015/0330650 A1* | 11/2015 | Abiprojo | G05B 15/02 |
| | | | 700/276 |
| 2017/0074589 A1* | 3/2017 | Somary | C21D 11/00 |

OTHER PUBLICATIONS

Surface combustion, "Press Release: Surface Combustion, Inc. has received an order for a Super Allcase® Batch Integral Quench furnace line with companion equipment from National Metal Processing, located in Richmond, Kentucky", Feb. 10, 2004. pp. 1. (Year: 2004).*

Surface combustion, "Control Systems", Aug. 13, 2018, pp. 3. (Year: 2018).*

Rockwell Automation, "PowerFlex 4M Adjustable Frequency AC Drive User Manual", Jun. 2013, pp. 114. downloaded from the internet at https://literature.rockwellautomation.com/idc/groups/literature/documents/um/22f-um001_-en-e.pdf (Year: 2013).*

Rockwell Automation, ("PowerFlex 750-Series AC Drives User Manual", 2009, pp. 438. downloaded from the internet at http://www.gny.com.tr/wp-content/uploads/2016/04/Allen-Bradley-Powerflex-750-Serisi-H%C4%B1z-Komtrol-Kullan%C4%B1m-K%C4%B1lavuzu.pdf (Year: 2009).*

Kean Univeristy, "Regression and correlation", Mar. 2009, pp. 9, downloaded from the internet at https://www.kean.edu/~fosborne/bstat/09rc.html (Year: 2009).*

Surface Combustion Manual, "TAL Pro Trend Alarm Log Pro Operating Instructions", 2008, pp. 1-29.

Surface Combustion Manual, "HTM Pro Heat Treat Management Professional Operating Instructions", 2015, pp. 1-129.

Surface Combustion Manual, "RX-3T-ABPERS Generator Operating & Maintenance Instructions", 2015, pp. 1-128.

* cited by examiner

Encoder Flange

Encoder Assembly
Scale 3"-1'-0"

ENCODER ASSEMBLY
FRONT VIEW

SYSTEM FOR CONTROLLING TORQUE-LIMITING DRIVE CHARGE CAR

RELATED APPLICATIONS

This application claims priority to U.S. Provisional Application Ser. No. 62/068,909 filed under 35 U.S.C. § 111(b) on Oct. 27, 2014, the disclosure of which is incorporated herein by reference in its entirety.

BACKGROUND OF THE INVENTION

Heat treating furnaces are often comprised of one environment, or chamber, designed to heat the treated materials, and another separate environment, or chamber, designed to perform rapid cooling or quenching. Charge cars, or other load-moving devices, are used to feed furnaces by supplying metal charge (such as metal ingots or scrap metal) into the furnaces. Charge cars are adaptable to the type and configuration of furnace being used (i.e., tilting, rotating, etc.). In certain designs, charge cars include a steel conveyor. The charge is stored in a load-bearing receptacle such as a hopper or bucket. Charge cars typically have geared motors installed and can be controlled through portable controls. Charge cars are often configured on a track or set of rails, and are movable along the track or rails from the home position into a charging position where the furnace is loaded.

Charge cars, and blockages or jams along the track of a charge car, can cause damage to furnace linings. Accordingly, there is a need to know when service to the furnace is necessary or advisable.

SUMMARY OF THE INVENTION

Provided herein is a system and method for controlling and regulating the movement of a load-moving system into and out of a heat treating furnace. In general, the system includes: detecting and transmitting a signal and a position of a load-moving system as the load-moving system traverses a plurality of positions; establishing a baseline of the signals detected/transmitted; trending the baseline over time; and, recommending an action, such as inspecting, repairing, and/or replacing a furnace aspect when the data surpasses a predetermined threshold value.

The signal can be one or more of: current, torque, or power used by the load-moving system at the position. In certain embodiments, the furnace aspect can be a furnace trolley, alignment of an elevator, and a furnace/vestibule threshold.

In certain embodiments, the method comprises determining a maximum signal for each position, and comparing the maximum signal for each position to a predetermined threshold signal, wherein the system suggests maintenance if the maximum signal for a position is greater than, or equal to, the predetermined threshold signal.

In particular embodiments, the maximum signal for the position is appended to a maximum signal trend, and the method comprises regressing the maximum signal trend over time, extrapolating the regression to determine the time intercept with the predetermined threshold signal, and calculating time to service by subtracting a current time from the determined time intercept, wherein the system updates time to service if the calculated time to service is greater than, or equal to, a stored time to service.

In certain embodiments, a trend mode is set on the load-moving system. In particular embodiments, the trend mode is selected from the group consisting of in with load, out with load, in without load, and out without load. In particular embodiments, the maximum signal for each position is appended to a maximum signal trend for the trend mode, and the method further comprises regressing the maximum signal trend for the trend mode over time, extrapolating the regression to determine the time intercept with the predetermined threshold signal, and calculating time to service by subtracting a current time from the determined time intercept, wherein the system updates time to service if the calculated time to service is greater than, or equal to, a stored time to service.

Further provided is a method for controlling a load-moving system comprising the steps of reading a signal and a position of a load-moving system as the load-moving system traverses a plurality of positions, wherein the signal is at least one of current, torque, or power used by the load-moving system at the position, and recommending maintenance at a position if the signal at the position exceeds a predetermined threshold signal. In certain embodiments, the method further comprises appending a signal vector from the signals read to a signal trend; regressing the signals read at each position versus time to produce a regression line; extrapolating the regression line for each position to determine the time intercept with a predetermined threshold signal; and calculating the time to service for each position by subtracting a current time from the determined time intercept, wherein the system updates the time to service at a given position if the calculated time to service at the position is greater than, or equal to, a stored time to service for the position.

In certain embodiments, the method further comprises the step of reading a trend mode before reading the signal and the position. In particular embodiments, the trend mode is selected from the group consisting of in with load, out with load, in without load, and out without load. In particular embodiments, the method further comprises appending a signal vector from the signals read to a signal trend for the trend mode; regressing the signals read at each position for the trend mode versus time to produce a regression line; extrapolating the regression line for each position for the trend mode to determine the time intercept with the predetermined threshold signal; and calculating time to service for each position by subtracting a current time from the determined time intercept at each position, wherein the system updates time to service for a given position if the calculated time to service for the position is greater than, or equal to, a stored time to service for the position.

In certain embodiments of any method described herein, the load-moving system can include a charge car, a rear handler, a charge table, and an elevator. In certain embodiments of any method described herein, the load-moving system comprises a torque-limiting drive.

Further provided is a load-moving system comprising a charge car having a receptacle configured to carry a load, a handler drive motor, and a lateral motor; a torque-limiting drive adapted to control the handler drive motor; a variable speed drive adapted to control the lateral motor; an encoder configured to sense movement; and a programmable logic controller capable of shutting off the handler drive motor. In certain embodiments, the programmable logic controller comprises a human-machine interface that presents processed data to a user. In certain embodiments, the system further comprises a laser apparatus configured to laser-align the charge car with a piece of furnace equipment. In certain embodiments, the system further comprises an electronic safety bumper on the charge car. In certain embodiments, the system is adapted to store or send data by Wi-Fi or an Ethernet connection.

Further provided is a furnace system comprising a furnace chamber; a load-moving system adapted to deliver a load into the furnace chamber, the load-moving system comprising a torque-limiting drive and an encoder configured to sense movement; and a programmable logic controller adapted to control the load-moving system. In certain embodiments, the load-moving system is configured to recommend maintenance to the furnace chamber based on signals read by the load-moving system.

DETAILED DESCRIPTION OF THE INVENTION

Figure 1:
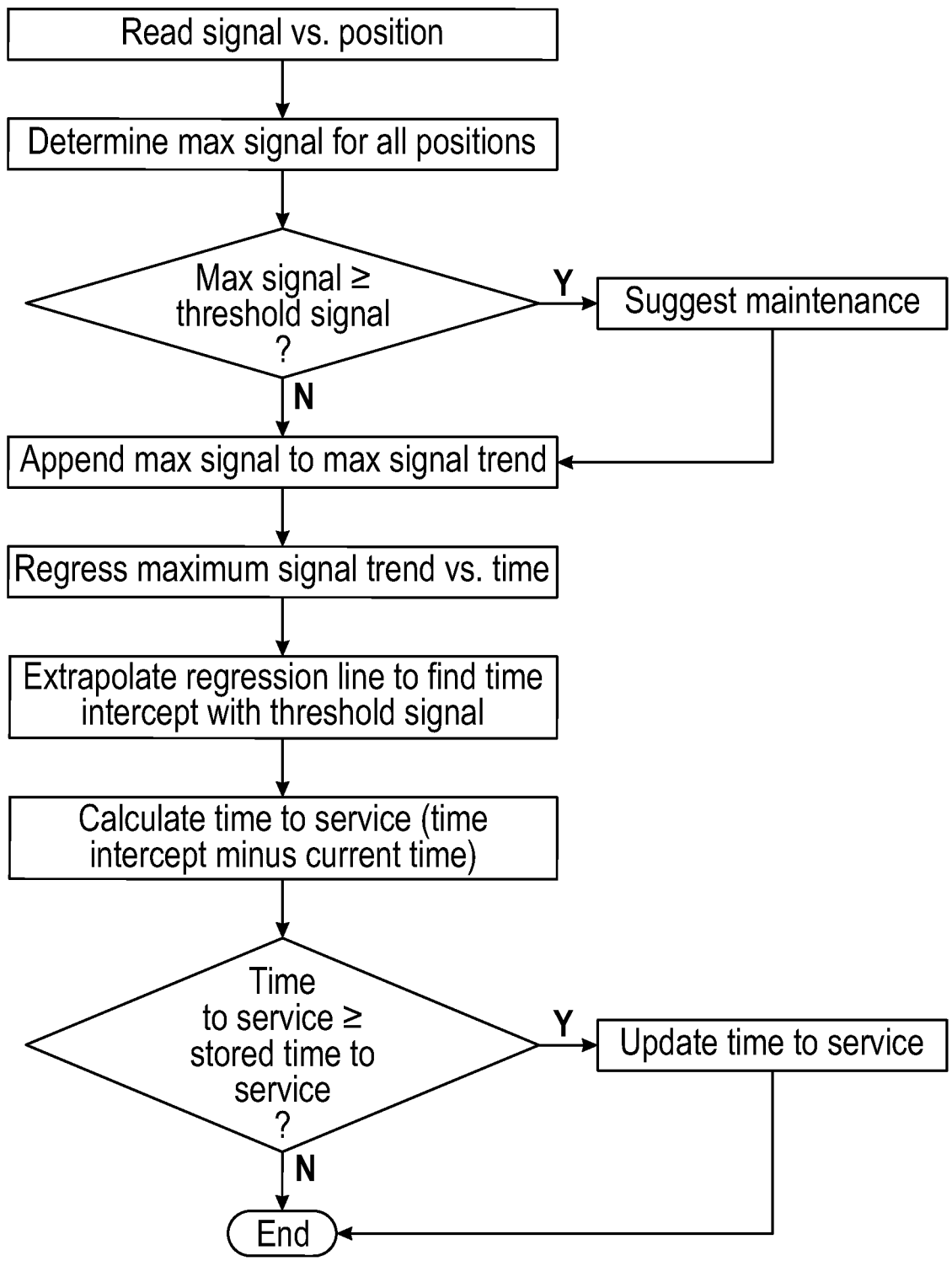
FIG. 1: Non-limiting example of a method used to predict time to service, wherein the maximum signal is stored with one trend.

Throughout this disclosure, various publications, patents and published patent specifications are referenced by an identifying citation. The disclosures of these publications, patents and published patent specifications are hereby incorporated by reference into the present disclosure in their entirety to more fully describe the state of the art to which this invention pertains.

In various places herein, the term "furnace" is used. It is to be understood, however, that the term "furnace" is used for convenience, and should be read to also include pieces of companion equipment.

A torque-limiting drive is a mechanism through which torque is transmitted to a driven shaft or its equivalent, with a device adapted to limit the maximum amount of torque transferred. In accordance with the present disclosure, a torque-limiting drive is applied to a loading or unloading device and controlled in such a manner as to be a predictive maintenance tool for furnaces or companion equipment. In certain embodiments, the torque-limiting drive is utilized for the handler motor on a load-moving system. Data is collected from the torque-limiting drive device in order to predict when maintenance needs to be performed on the furnace or companion equipment. A charge car is described in various places herein for illustrative purposes, but the methods and methods disclosed can be applied to any load-moving system, such as, but not limited to, a charge car, a rear handler, a charge table, an elevator, or any other furnace loading, unloading, or automation system where a torque-limiting drive is applied.

There are several suitable maintenance points that can be tracked, singly or in combination, by a torque-limiting drive load-moving system. These include, but are not limited to, the furnace alloy, elevator misalignment, and the furnace/vestibule threshold. Furnace alloy deteriorates over time and becomes misaligned. In certain embodiments, the furnace alloy deterioration is tracked in order to determine when maintenance on the furnace alloy is needed. After establishing baseline data regarding how much power, torque, and/or current the furnace loading mechanism needs to load or unload the furnace, the data is trended over time. Once the data surpasses a particular threshold value, the control system can recommend inspecting, repairing, and/or replacing the furnace alloy. This includes, but is not limited to, chain guides, roller rails, and posts. Additionally, the system can be tailored to analyze the historical trend data and then provide an estimate of how much time is left before the furnace alloy should be replaced.

For a batch integral quench furnace, the elevator is sometimes misaligned. In certain embodiments, the elevator misalignment is tracked in order to determine when re-alignment of the elevator is needed. By tracking the power, torque, and/or current output of the furnace loading mechanism, a method can be used to tell if the elevator should be adjusted.

One method used during the transfer of a green (unheated) load into a heating chamber is to first pass the green load through a vestibule. Such vestibules can be the most dangerous part of any furnace system. That is, it is the most likely place to have an explosion due to the possibility of the mixing of the air and vestibule gases. Thus, it is important that the vestibule and the furnace/vestibule threshold be properly maintained. In certain embodiments, the furnace/vestibule threshold is tracked in order to determine when maintenance on the furnace/vestibule threshold is needed. The system can be used to determine if the furnace/vestibule threshold is misaligned or if the alloy needs to be replaced.

In order to track the above maintenance points, the load-moving system with a torque-limiting drive records the maximum power, torque, and current required to move the load. The system approximates or calculates (from the speed) where the furnace loading mechanism is within the furnace or companion equipment. Alternatively, a user can input this information manually. The system is also told which furnace or piece of companion equipment in a line the furnace loading mechanism is servicing, if the furnace loading mechanism serves multiple pieces of equipment (e.g., a charge car).

Structurally, various embodiments of the system can be retrofitted onto existing load-moving systems. A torque limiting drive for the handler motor is incorporated into a load-moving device in lieu of, for example, a Mayfran clutch, and an encoder is incorporated into the device in lieu of, for example, a Kamco rotary limit switch. Many suitable torque-limiting drives are possible. In one non-limiting example, the torque-limiting drive is an AB PowerFlex 753 drive. In one non-limiting example, the variable speed drive is an Allen Bradley 4M variable speed drive. Suitable encoders include, but are not limited to, optical encoders or magnetic encoders. In one non-limiting example, the encoder is an AB 842 multi-turn encoder. These changes alleviate various maintenance issues associated with mechanical clutches. Because the system is electronic-based, there is no loss of accuracy through mechanical wear.

The encoder senses movement and position of the tray, and the system is controlled by a programmable logic controller (PLC) with a human-machine interface (HMI). A PLC is a digital computer used for automation of electromechanical processes. The HMI is a device that presents processed data to the operator. Alternatively, a remote terminal unit (RTU) could be used in place of the PLC. In certain embodiments, a timer is activated if power is supplied to the handler drive motor but the encoder senses no movement. After the timeout, the programmable logic controller shuts off the handler drive motor.

The system can include a joy stick potentiometer for operator control of the lateral motor, as opposed to reversing starters for lateral drive. The mechanical assembly of an existing system can remain largely unchanged while the torque-limiting drive, encoder, PLC, and HMI are incorporated. For automation, the system can be integrated with HTMPRO, a hardware/software suite for transponder key making, transponder key programming, transponder key copying, and PIN code/security code calculating. Optionally, the system can store or can send data by Wi-Fi or an Ethernet connection. Also optionally, the system can include a laser apparatus for laser alignment with equipment, and/or an electronic safety bumper. Furthermore, the system can be run on 24 VDC power instead of 120 VAC like some existing charge cars.

The drive protection protects the handler system from operator error in aligning the car with the heating equipment, poor conditions of base trays, loads extending beyond the design load criteria (i.e., loads that are too high, too wide, too long, too heavy, or are tilted and no longer within the vertical plane for the work envelope), poor condition of equipment hearths and chain guides, and debris in or on equipment hearths and chain guides. The system also allows for soft starts and stops during load and unload motions to minimize the shock loading of the handler system created by reversing starters in certain existing load-moving devices. This also mitigates the frequency of breakdowns.

The maximum torque limit value can be determined and programmed into the system. The torque limit can be adjusted by the user through a drive operator panel, but once the torque limit is electronically set in the drive, it cannot be exceeded. If the torque limit setting is exceeded, the drive will adjust the power to the motor. For example, if RPM decreases, the power to the motor will decrease. However, the drive will not shut off if the torque limit value is exceeded. Therefore, in certain embodiments, a shear pin setting is stored in the torque limiting drive. If the drive output current exceeds the stored shear pin value, a timer will start. After the timer runs out, the drive will shut off. In one non-limiting example, the timer is set at 0.5 seconds. The torque limit and shear pin settings can be the same for both automatic and manual operation. These settings are based on the handler driveshaft torque rating.

The torque-limiting drive charge car, or other torque-limiting drive load-moving system, can be used as a predictive maintenance tool by trending the power, torque, and/or current necessary to load or unload the furnace. After establishing a baseline, a method is used to analyze the trend and predict when a threshold power, torque, and/or current value will be reached. In certain embodiments, the method is selected from the "time-to-service" methods depicted in FIGS. 1-4. It is to be understood that many other methods could be used to achieve the same result.

Referring now to the method depicted in FIG. 1, one embodiment of the process begins with the system reading the signal and determining its position. Then, the system refers to the maximum signal for each position, and determines whether the recorded signal is greater than or equal to the maximum signal for the given position. If so, then the system suggests maintenance. If not, the maximum signal is appended to a maximum signal trend. The trend is regressed versus time and extrapolated to find the time intercept with the threshold signal. The time intercept is the suggested maintenance time, and the time to service can be calculated by subtracting the current time from the time intercept. Once calculated, the system compares the time to service to the stored time to service to determine whether the stored time to service is greater than or equal to the calculated time to service. If the stored time to service is greater than or equal to the time to service, the system updates time to service.

Figure 2:
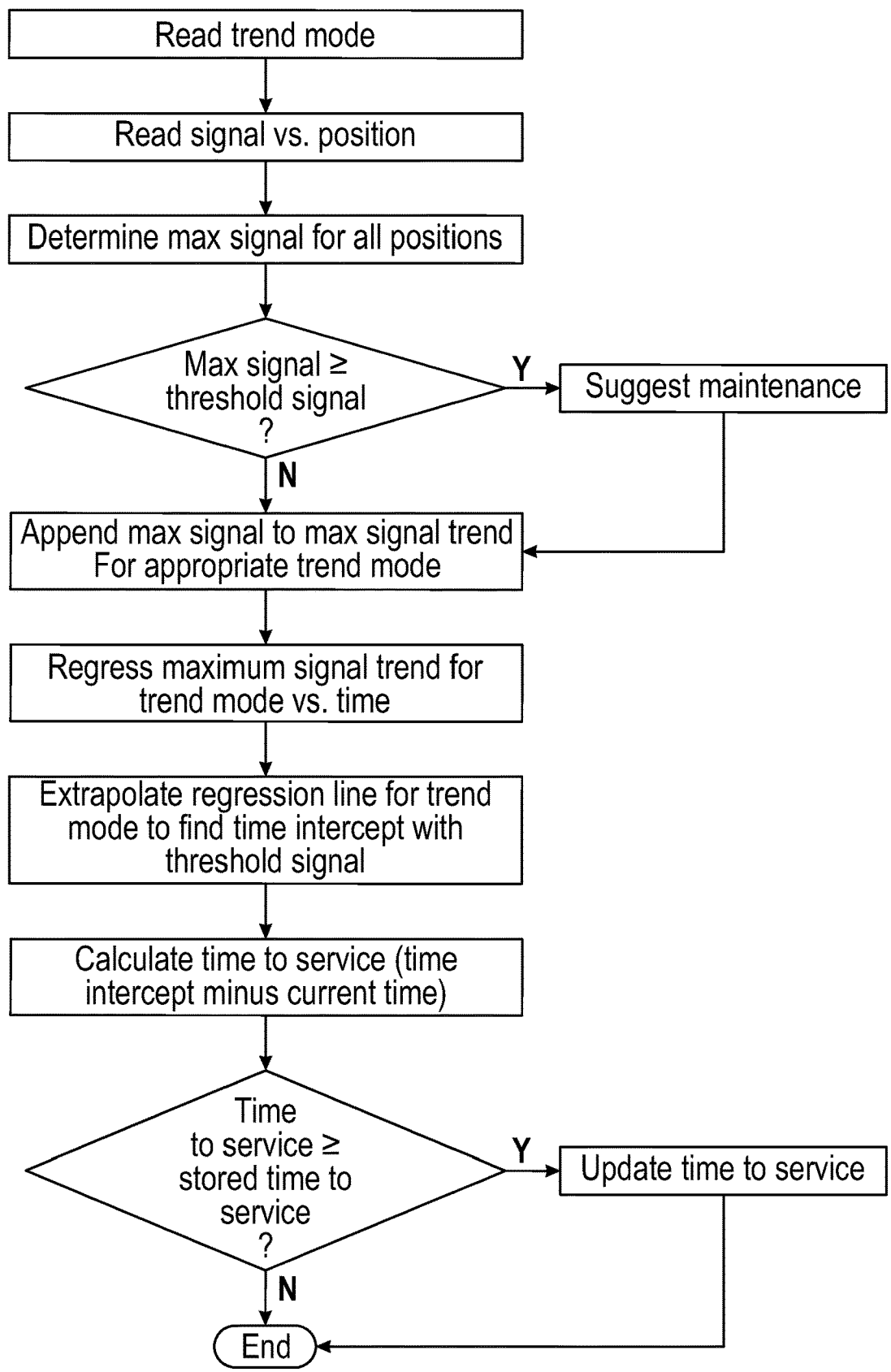
FIG. 2: Non-limiting example of a method used to predict time to service, wherein the maximum signal is stored in an appropriate trend. Trend modes possible include in with load, out with load, in without load, and out without load.

FIG. 2 shows an alternative embodiment of the method used to predict time to service. In this method, the maximum signal is stored in an appropriate trend. The process begins with the system reading a trend mode input by the user. The trend mode can be in with load, out with load, in without load, or out without load. The system then reads a signal and a position, determines the maximum signal for all positions, and compares whether the maximum signal is greater than or equal to a threshold signal. If so, the system suggests maintenance. The maximum signal is appended to a maximum signal trend, which is determined by the appropriate trend mode. The maximum signal trend for the appropriate trend mode is regressed versus time, and the regression line for the relevant trend mode is extrapolated to find the time intercept with the threshold signal. The time to service is then calculated by subtracting the current time from the time intercept. The time to service is compared with the stored time to service to determine whether the time to service is greater than or equal to the stored time to service. If so, the system updates the time to service.

Figure 3:
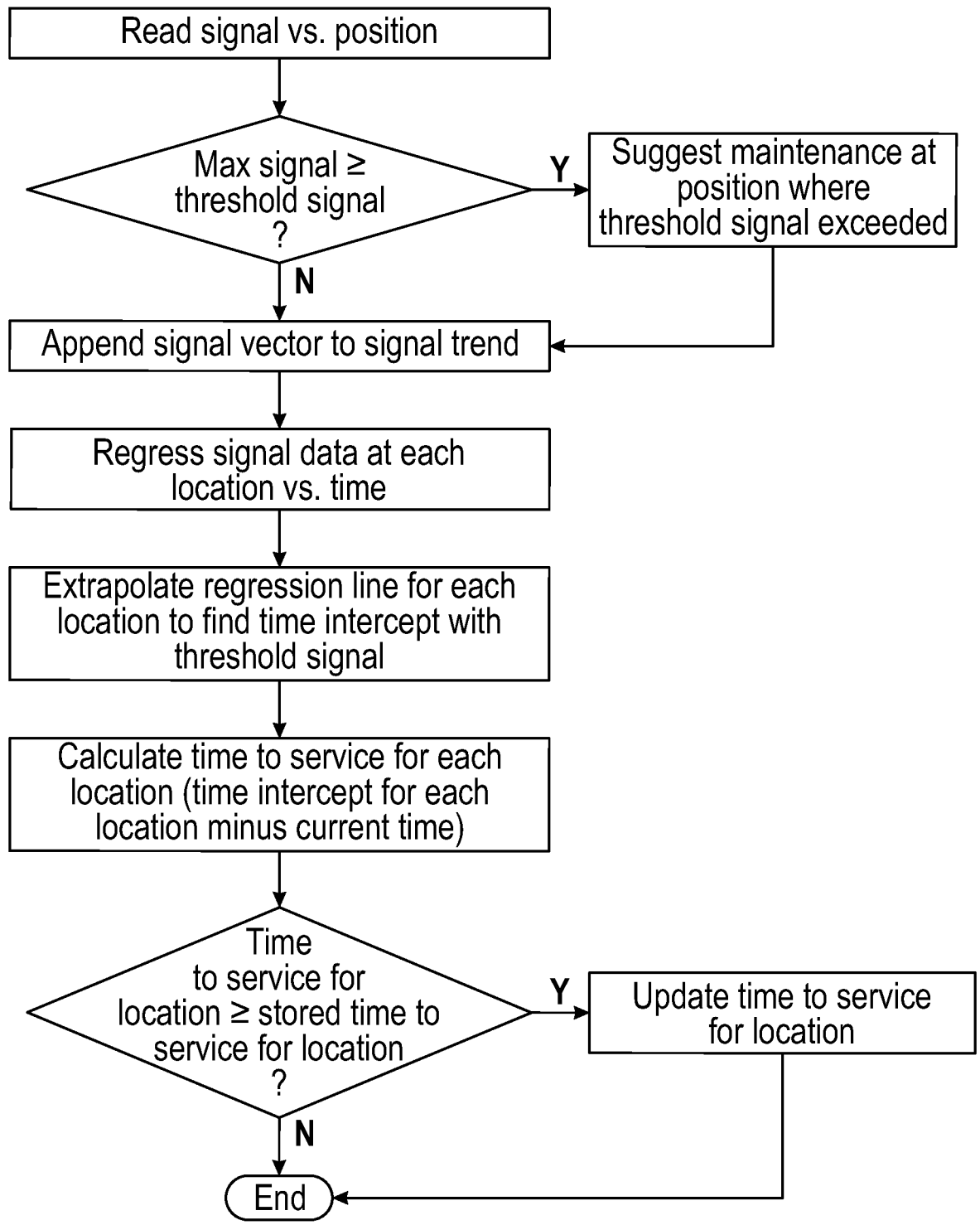
FIG. 3: Non-limiting example of a method used to predict time to service, wherein the vector of signal versus position is stored with one trend.

FIG. 3 shows an alternative embodiment of the method used to predict time of service. In this method, the vector of signal versus position is stored in one trend. The process begins with the system reading a signal and position. The system then compares the signal to the threshold signal. If a signal is found to be greater than or equal to a threshold signal, then the system suggests maintenance at the position where the threshold signal was exceeded. The system appends a signal vector to a signal trend, regresses the signal data at each location versus time, and extrapolates the regression line for each location to find the time intercept with the threshold signal. Time to service is then calculated for each location by subtracting the current time from the time intercept for each location. The system then compares the calculated time to service for each location to the stored time for service for each respective location. If the calculated time to service for a location is greater than or equal to the stored time to service for the location, the system updates the time to service for that location.

Figure 4:
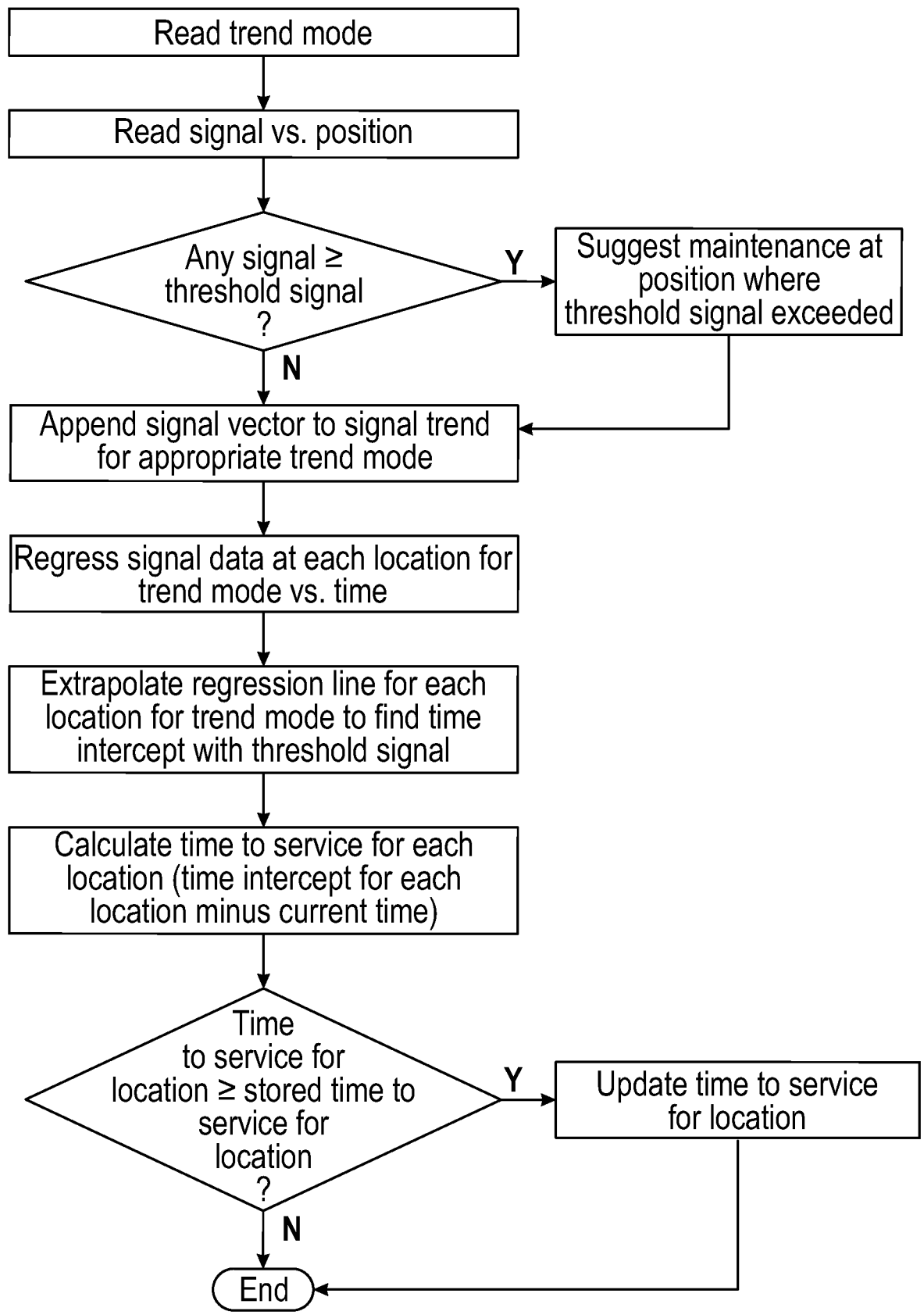
FIG. 4: Non-limiting example of a method used to predict time to service, wherein the vector of signal versus position is stored in an appropriate trend. Possible trend modes include in with load, out with load, in without load, and out without load.
Figure 5:
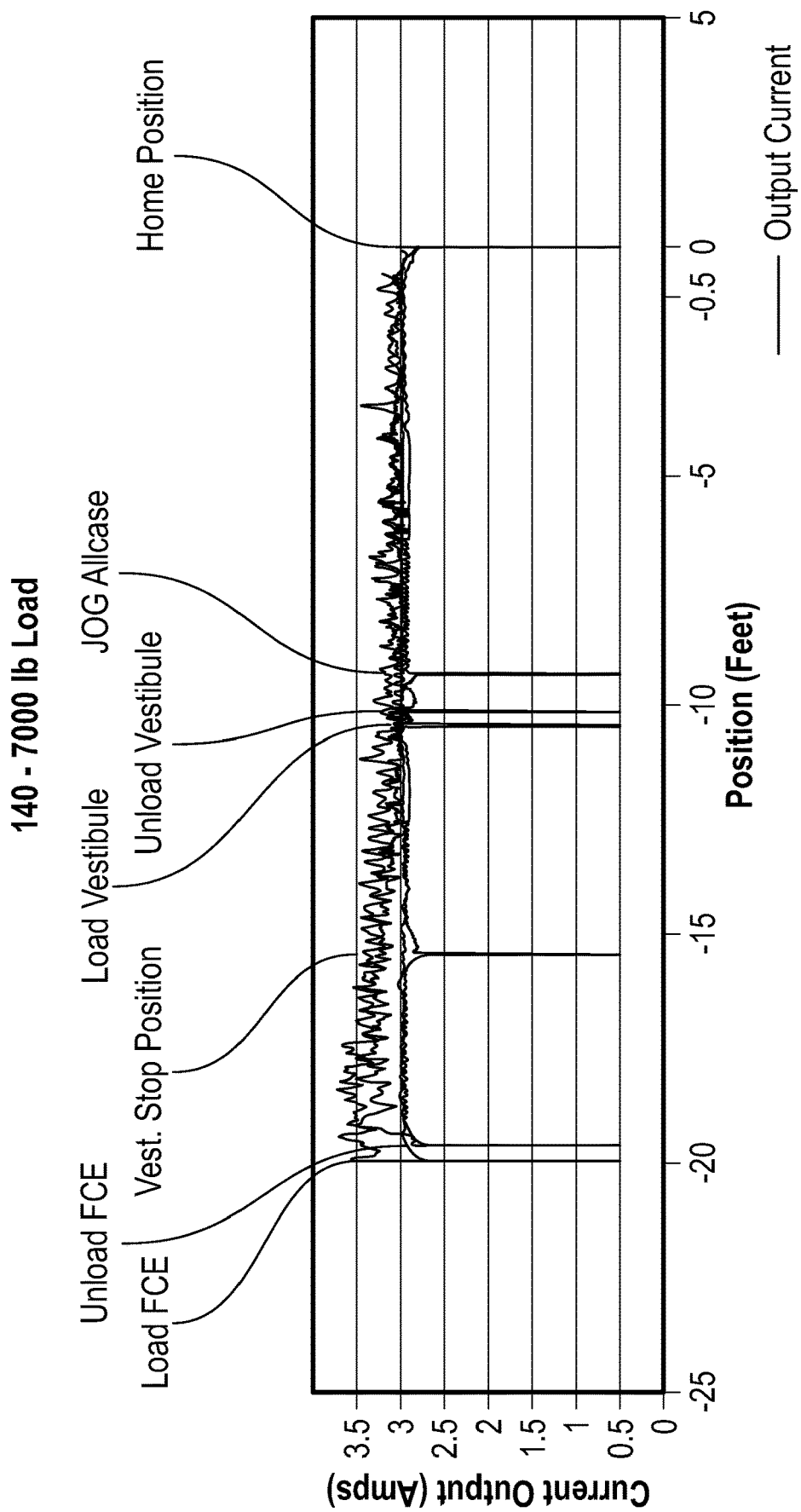
FIG. 5: Graph showing output current as a function of position of a charge car carrying a load of 7000 lbs.
Figure 6:
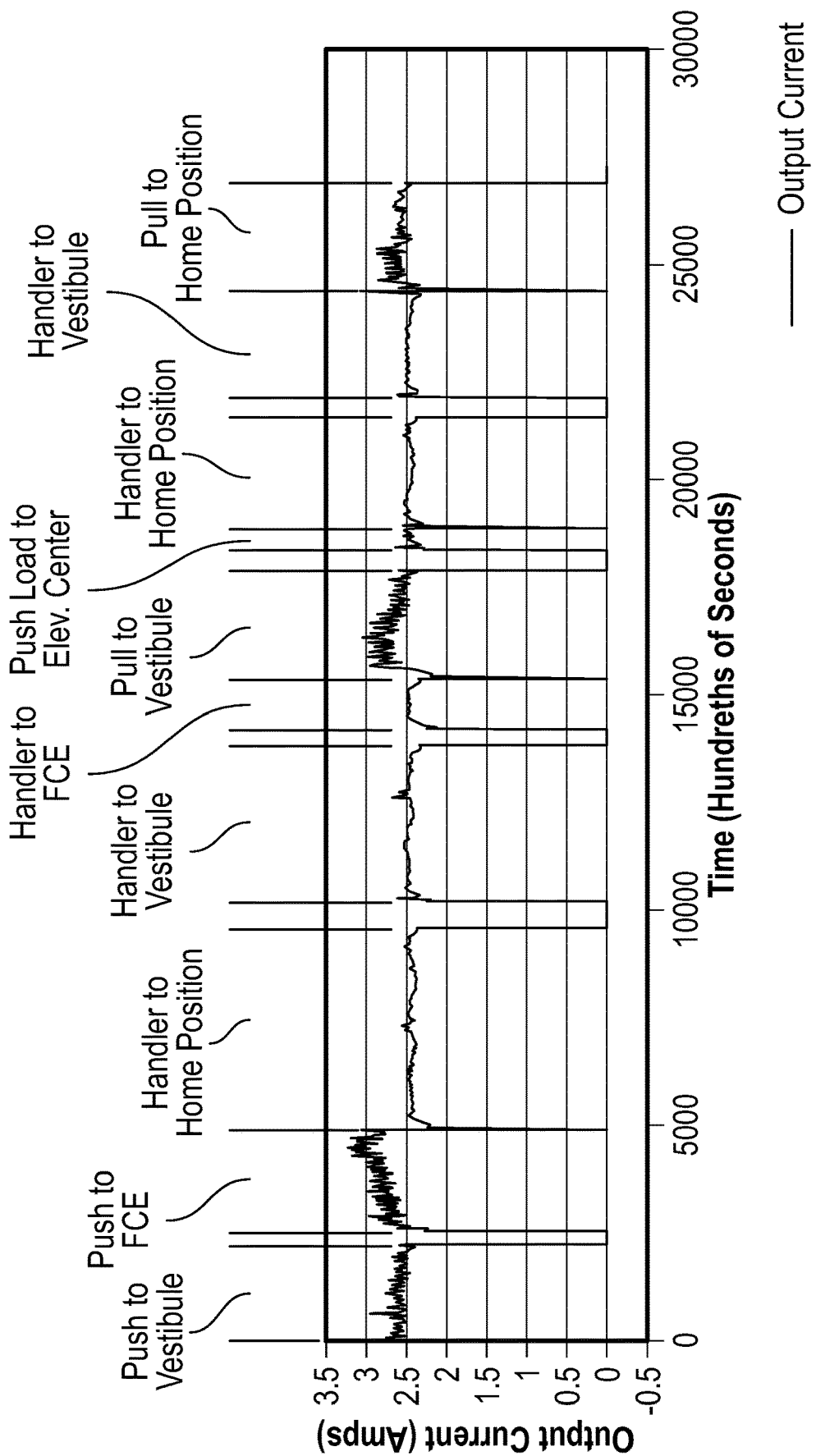
FIG. 6: Graph showing output current as a function of time at various positions of a charge car carrying a load of 7000 lbs.
Figure 7:
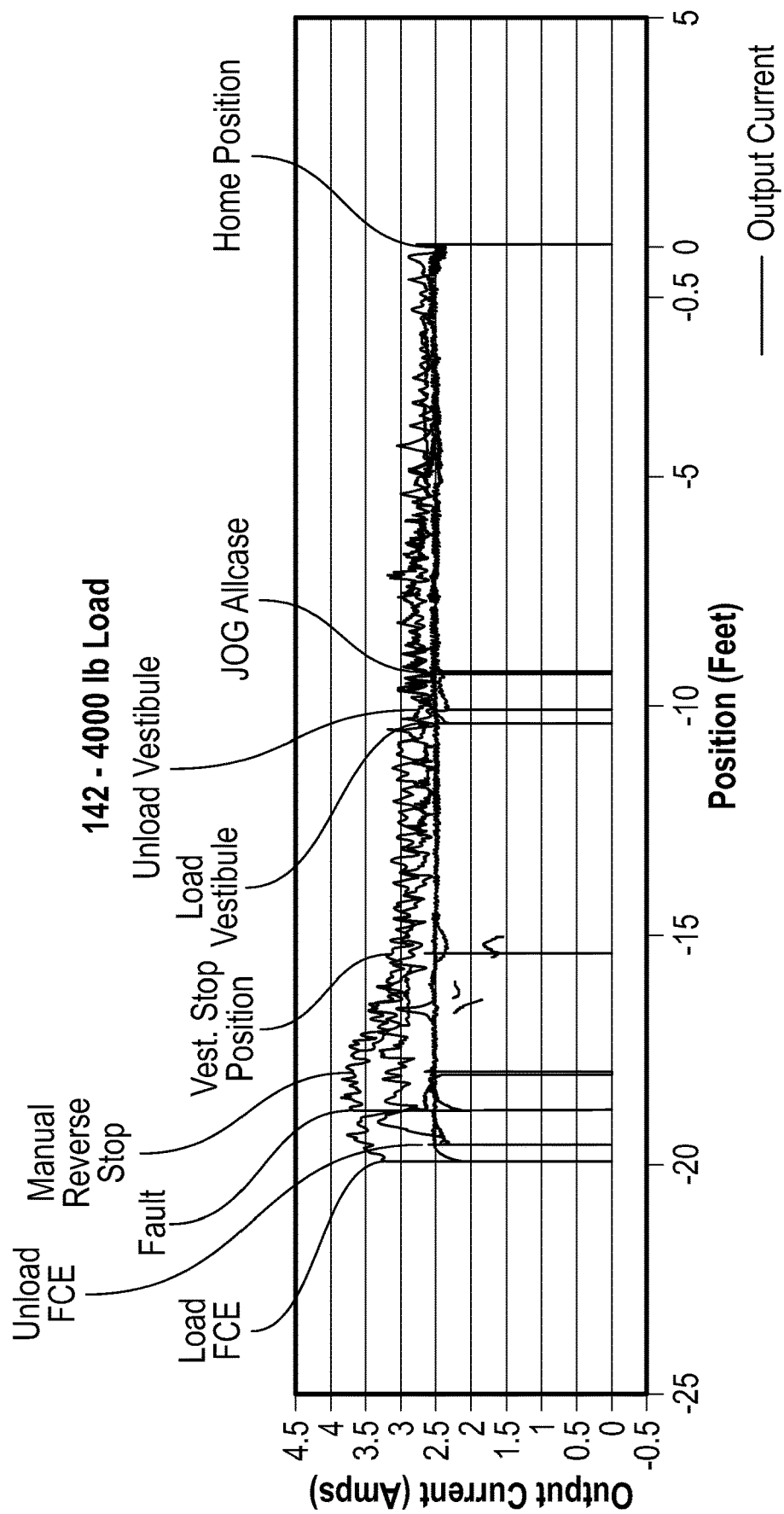
FIG. 7: Graph showing output current as a function of position of a charge car carrying a load of 4000 lbs.
Figure 8:
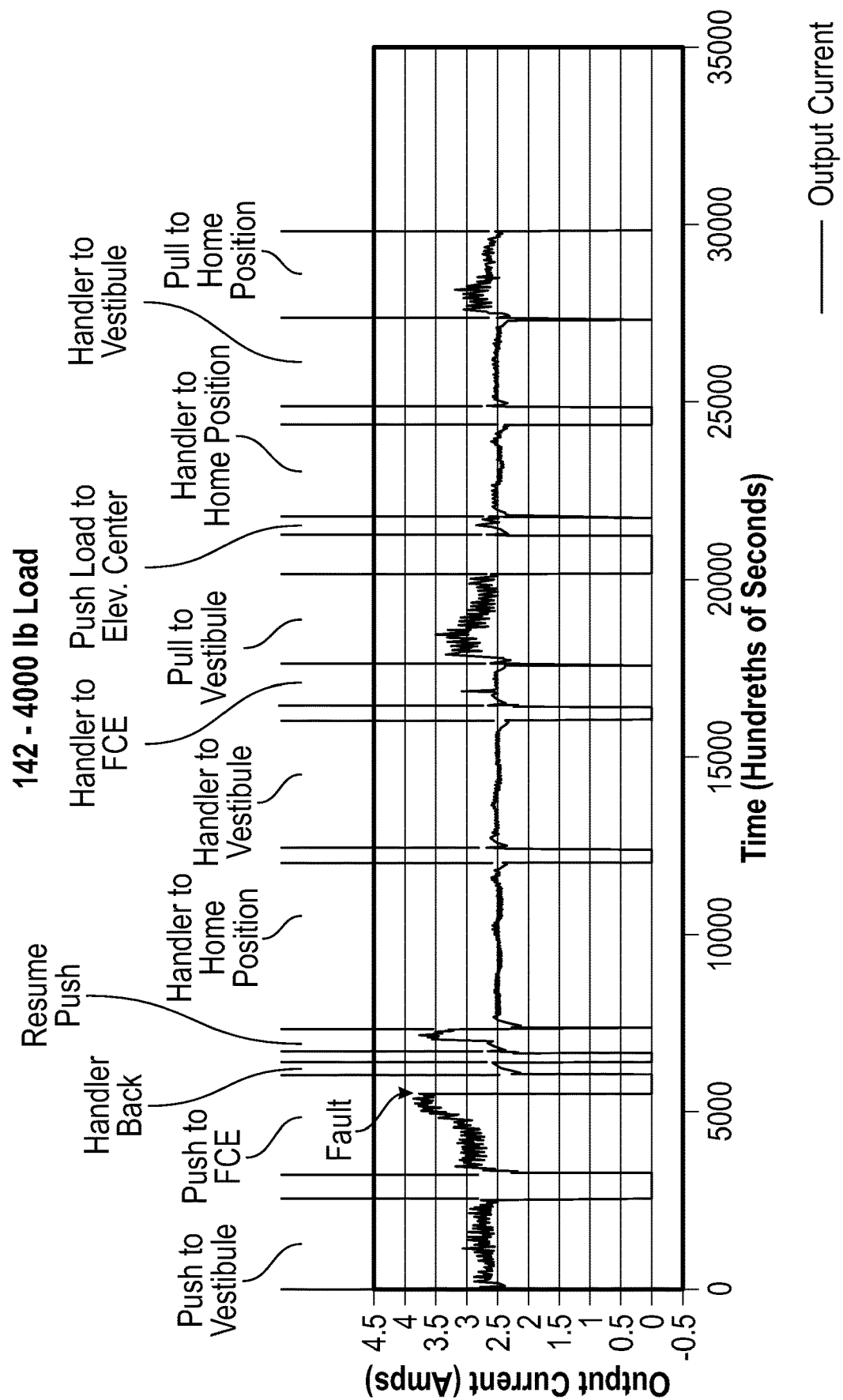
FIG. 8: Graph showing output current as a function of time at various positions of a charge car carrying load of 4000 lbs.
Figure 9:
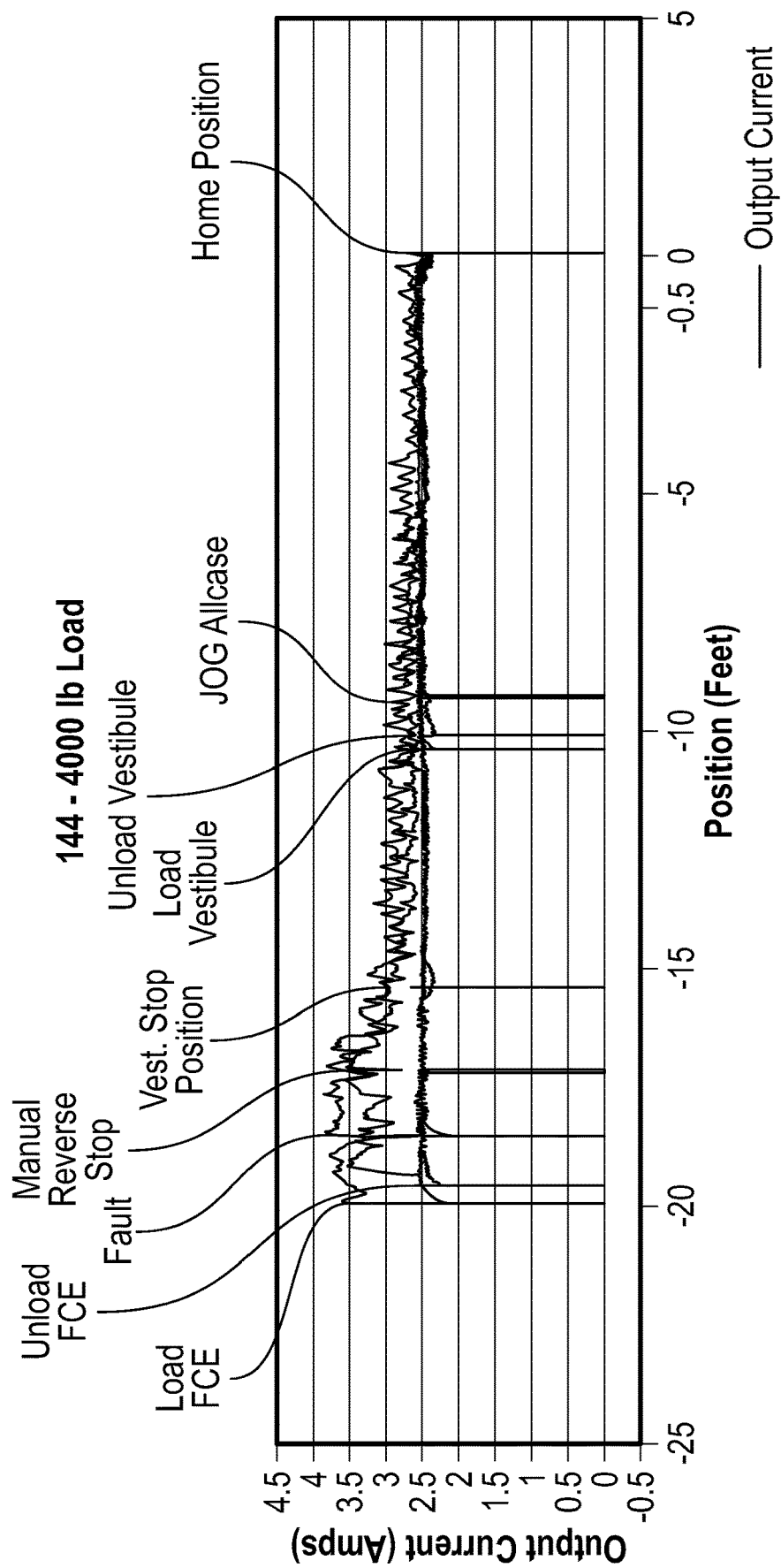
FIG. 9: Graph showing output current as a function of position of a charge car carrying a load of 4000 lbs.
Figure 10:
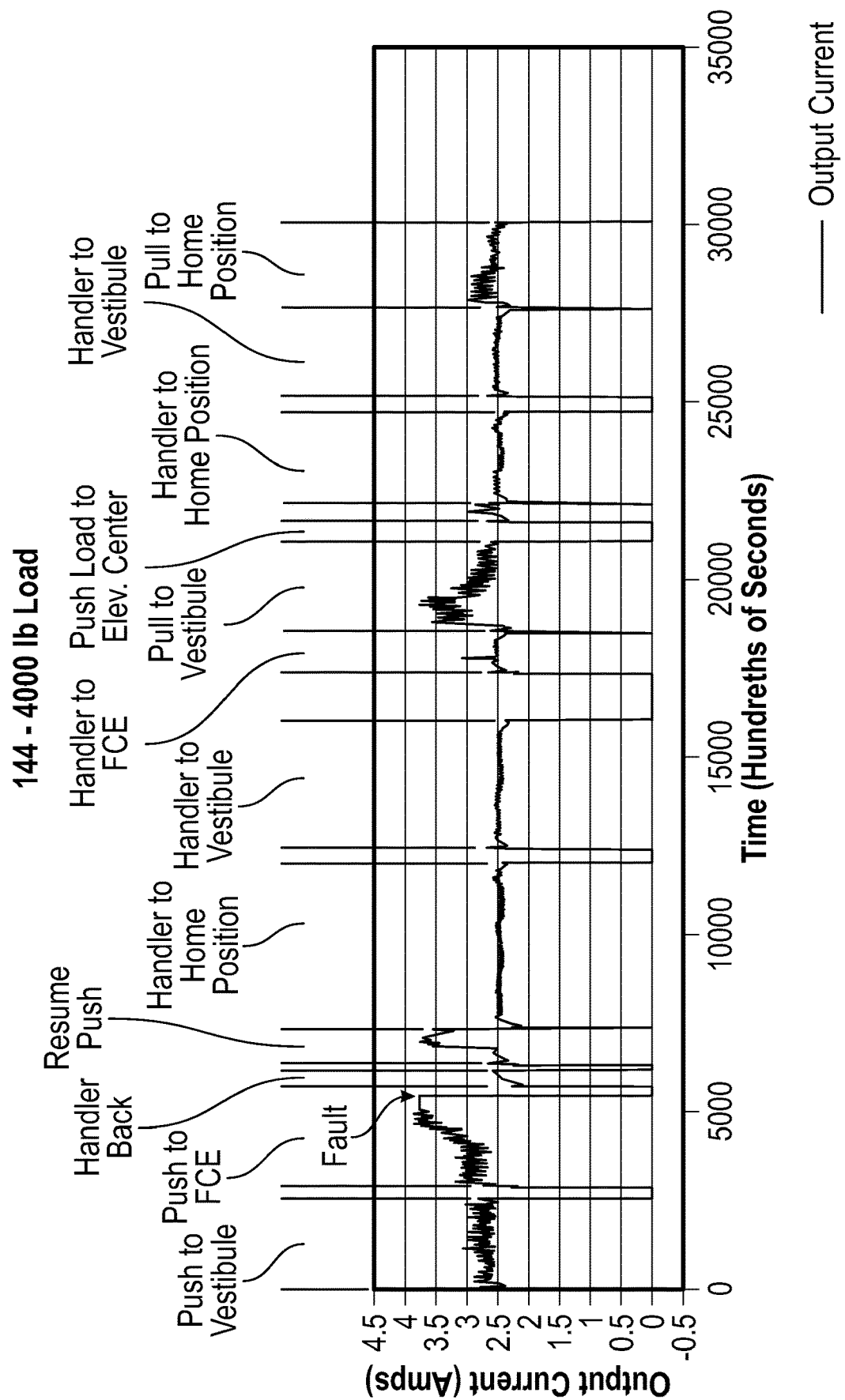
FIG. 10: Graph showing output current as a function of time at various positions of a charge car carrying a load of 4000 lbs.
Figure 11:
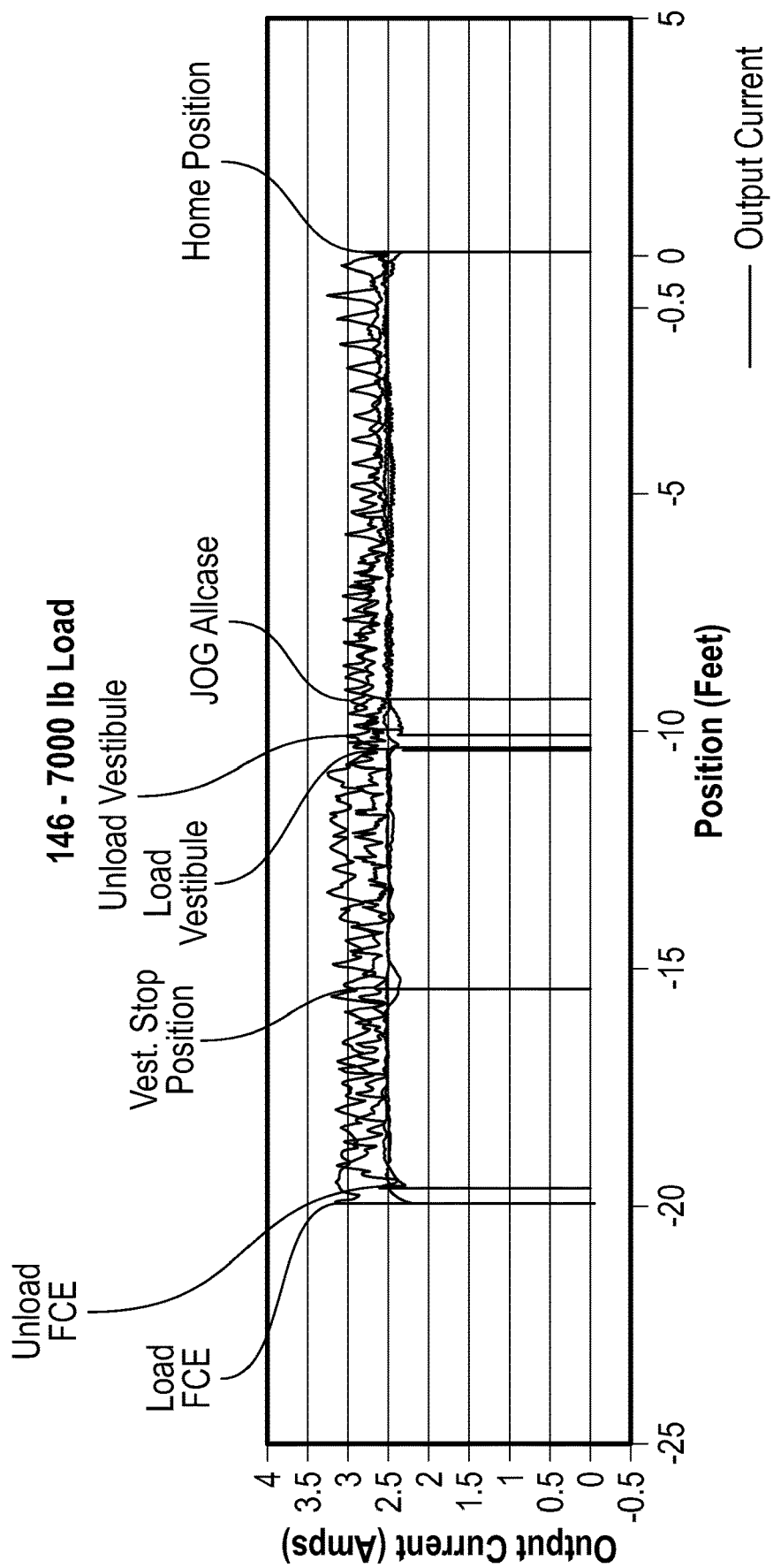
FIG. 11: Graph showing output current as a function of position of a charge car carrying a load of 7000 lbs.
Figure 12:
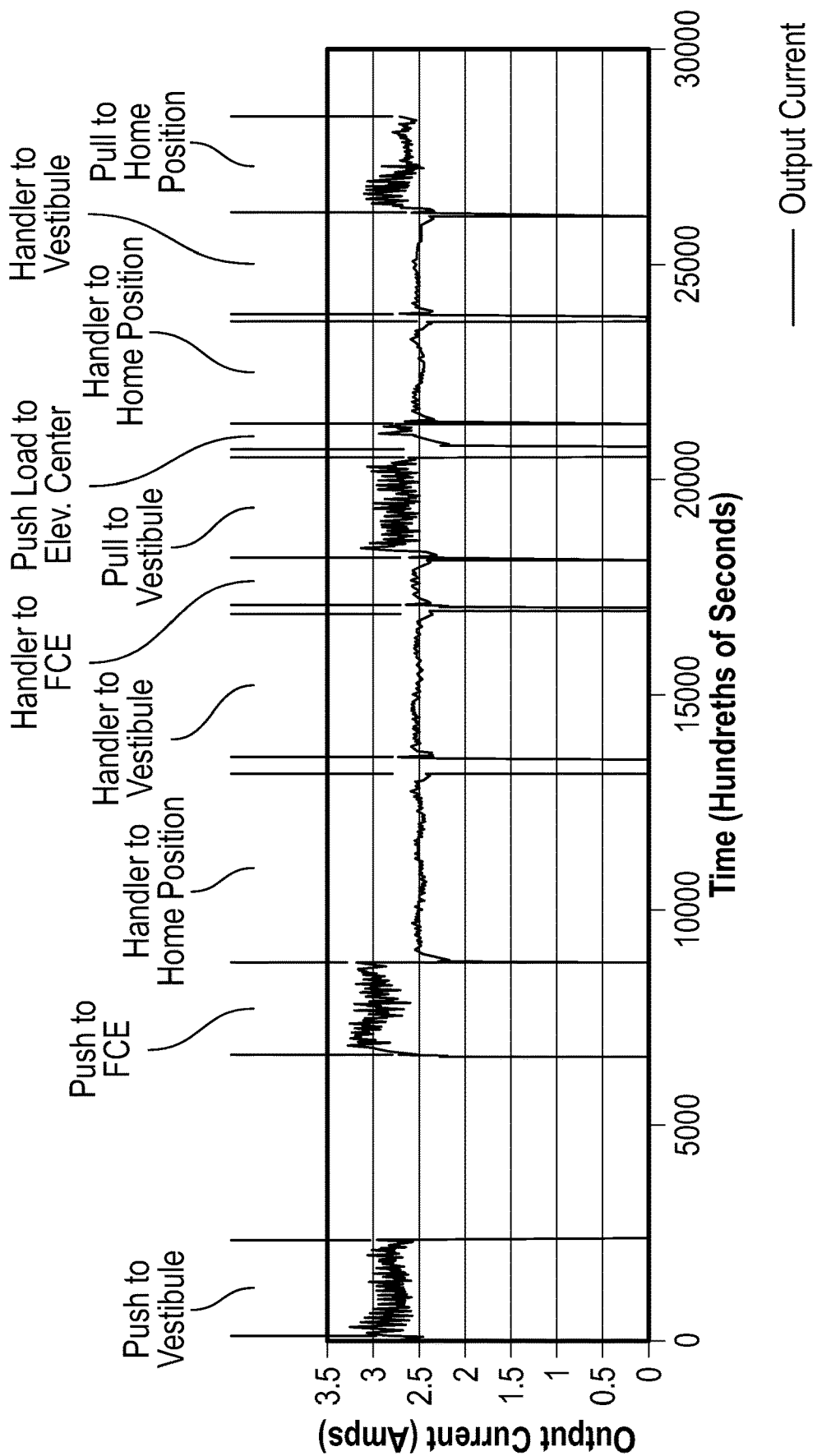
FIG. 12: Graph showing output current as a function of time at various positions of a charge car carrying a load of 7000 lbs.

FIG. 4 shows an alternative embodiment of the method used to predict time of service. In this method, the vector of signal versus position is stored in an appropriate trend. The process begins with the system reading a signal and position. The system then compares the signal to the threshold signal. If a signal is found to be greater than or equal to a threshold signal, then the system suggests maintenance at the position where the threshold signal was exceeded. The system appends the signal vector to a signal trend for the appropriate trend mode. Possible trend modes are in with load, out with load, in without load, or out without load. The signal data is regressed at each location for the appropriate trend mode versus time. The regression line is extrapolated for each location for the relevant trend mode to find the time intercept with the threshold signal. The system then calculates the time to service for each location by subtracting the current time from the time intercept for each location. The system compares the time to service for each location to the stored time to service for each respective location. If a time to service at a location is greater than or equal to the stored time to service for the location, the system updates the time to service for that location.

The system and methods described herein can be incorporated into the load-moving system for any of a wide variety of furnace systems. By way of non-limiting examples, suitable furnace systems include, but are not limited to, standard atmosphere furnaces, single-chamber vacuum furnaces, multi-chamber vacuum furnaces, gas-fired vacuum furnaces, carburizing furnaces, vacuum tempering furnaces, batch integral quench furnaces, batch tempering furnaces, box furnaces, carbottom furnaces, forge furnaces, lift cover furnaces, batch coil anneal furnaces, tilt top furnaces, elevator hearth furnaces, cover and base furnaces, pit furnaces, gas nitriding furnaces, belt furnaces, chain conveyor furnaces, roller hearth furnaces, rotary hearth furnaces, rotating finger furnaces, screw conveyor furnaces, shaker hearth furnaces, horizontal floater furnaces, drop bottom furnaces, continuous strip furnaces, chairback furnaces, forge furnaces, anneal and pickle furnaces, walking beam furnaces, walking hearth furnaces, tube quench & temper furnaces, continuous tray furnaces, continuous rotary retort furnaces, and metal parts furnaces. Thus, provided herein is a furnace system having a furnace chamber and a load-moving system adapted to deliver a load into the furnace chamber. The load-moving system includes a torque-limiting drive, an encoder, and a programmable logic controller.

Figure 13:
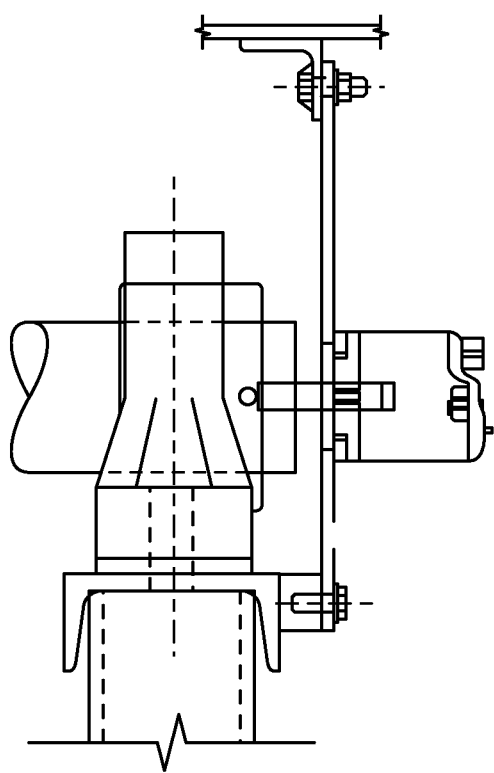
FIG. 13 is s schematic illustration of an encoder assembly useful with a charge car.
Figure 13:
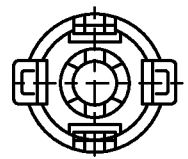

FIG. 13 is s schematic illustration of an encoder assembly useful with a charge car.

Figure 14:
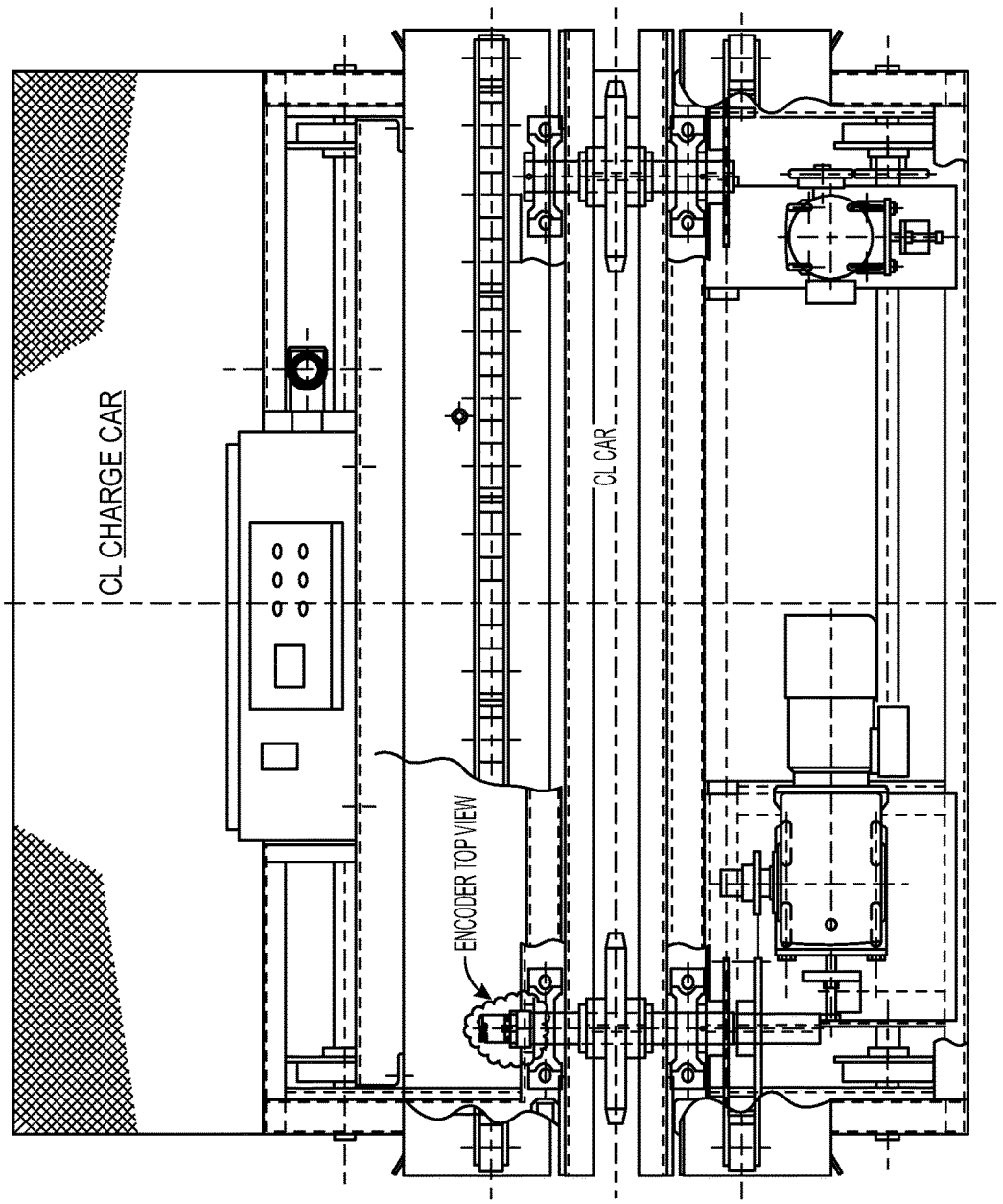
FIG. 14 is a schematic illustration of a top elevational view of a charge car having an encoder assembly.

FIG. 14 is a schematic illustration of a top elevational view of a charge car having an encoder assembly.

Figure 15:
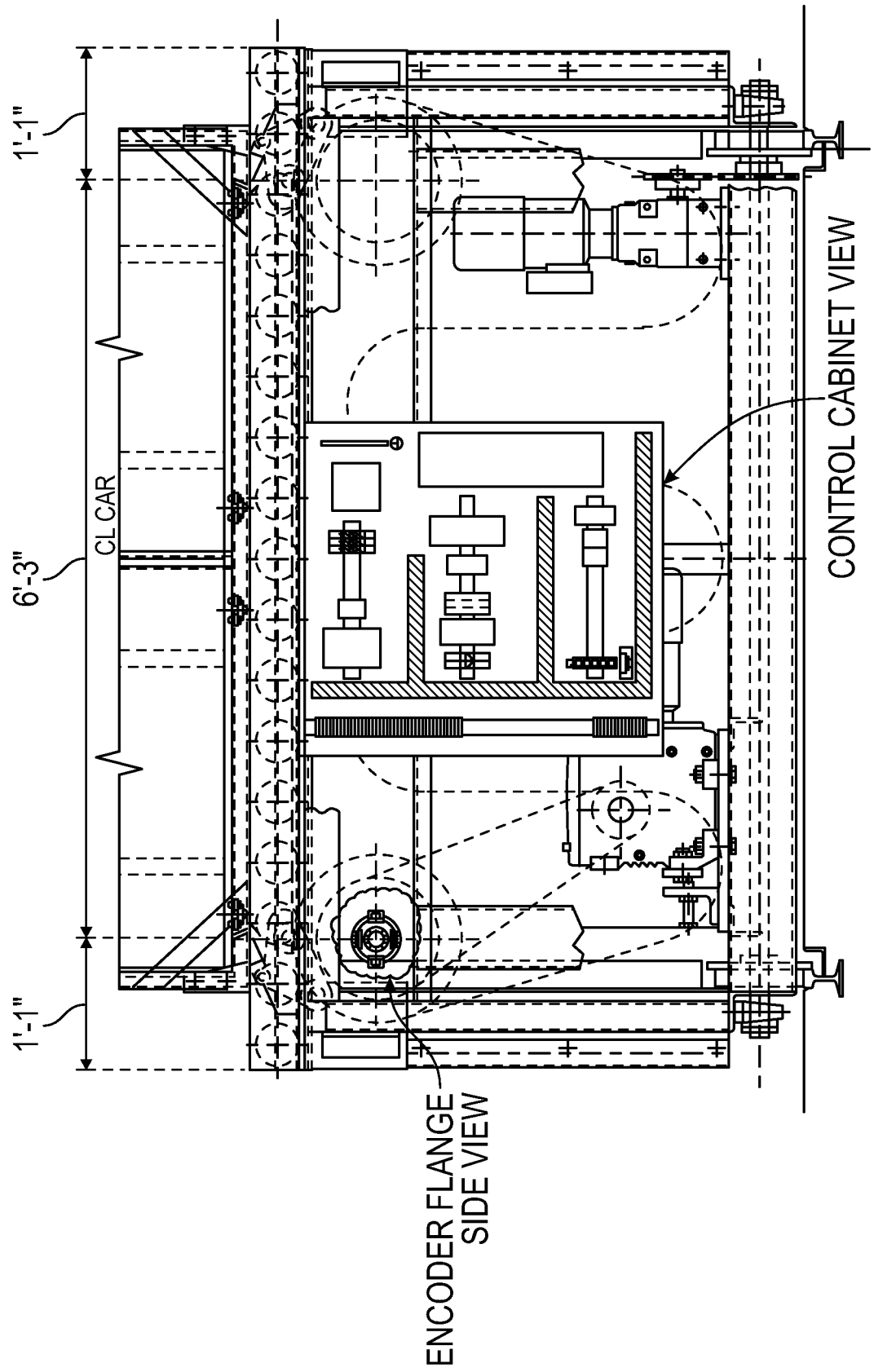
FIG. 15 is a schematic illustration of a front elevational view of a charge car having an encoder assembly.

FIG. 15 is a schematic illustration of a front elevational view of a charge car having an encoder assembly.

Figure 16:
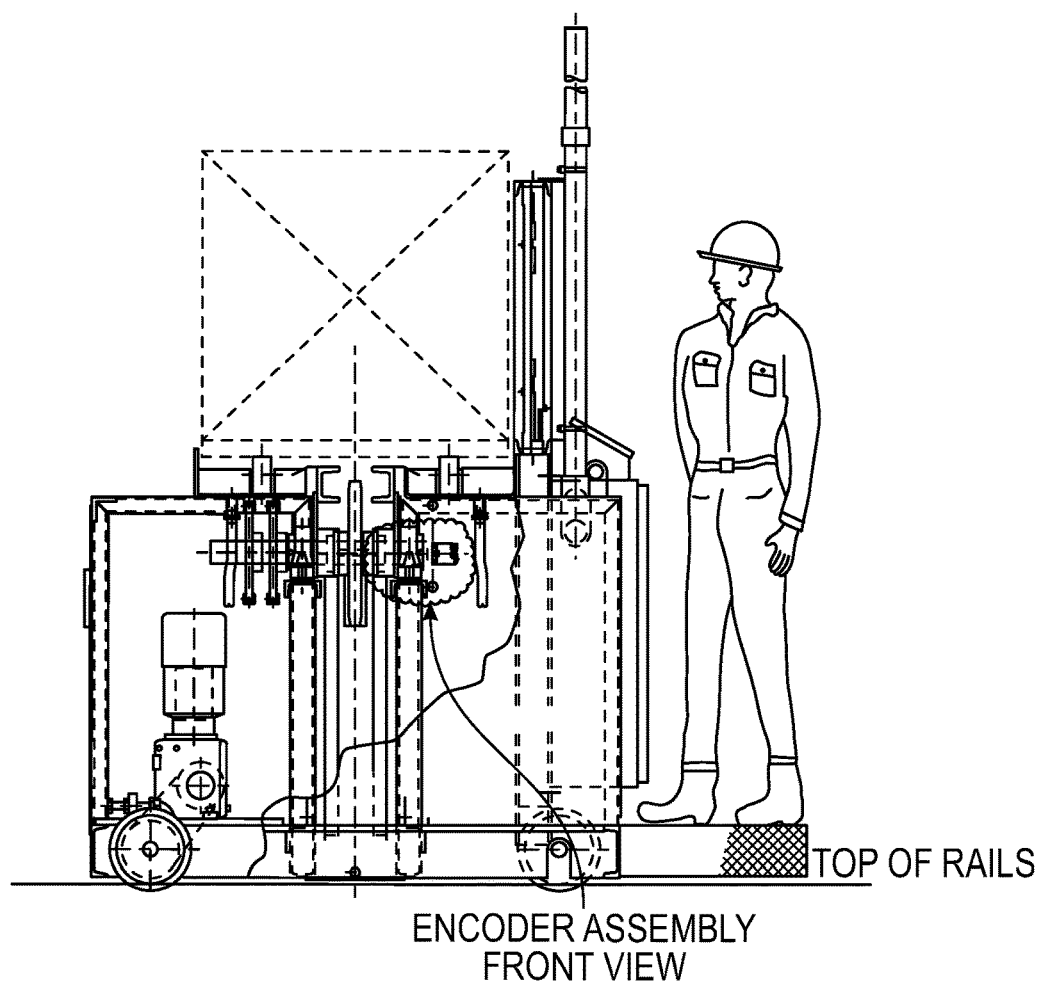
FIG. 16 is a schematic illustration of a side elevational view of a charge car having an encoder assembly.

FIG. 16 is a schematic illustration of a side elevational view of a charge car having an encoder assembly.

Figure 17:
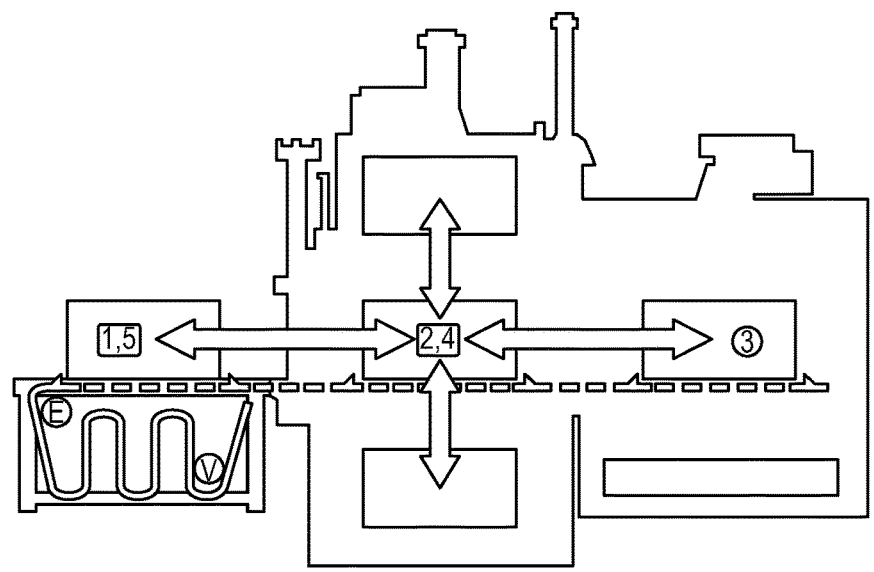
FIG. 17 is a schematic illustration of a furnace system having a charge car, and showing a view of: from Front Car/Table Push/Pull.

FIG. 17 is a schematic illustration of a furnace system having a charge car, and showing a view of: from Front Car/Table Push/Pull. In the embodiment shown in FIG. 17, E is an encoder, V is a VFD controlled gearmotor, 1 shows the Load Position; 2 shows the Vestibule Load Position; 3 shows the Furnace Position; 4 shows the Vestibule Position after unloading furnace; and, 5 shows the Unload Position.

Figure 18:
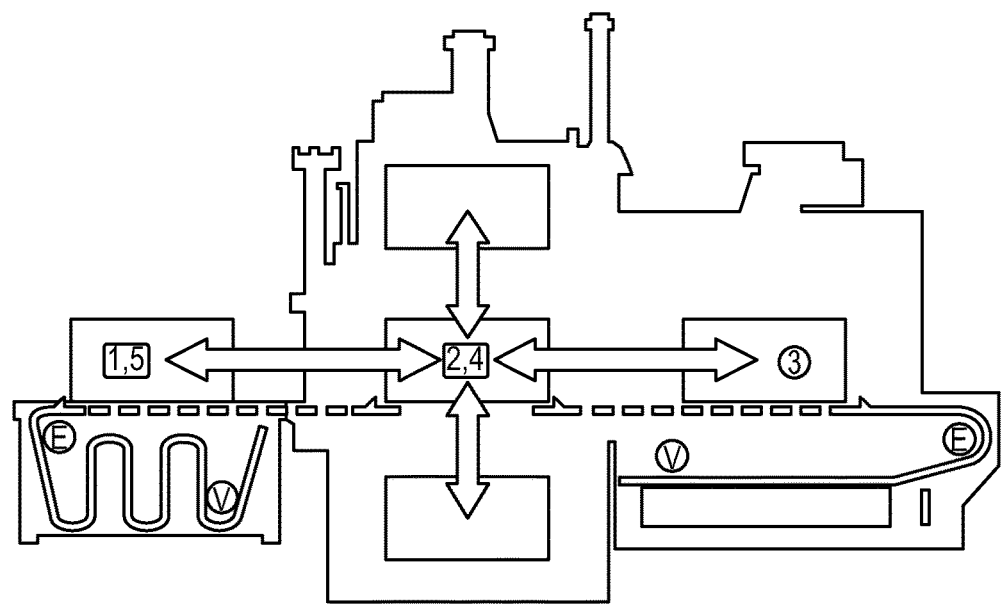
FIG. 18 is a schematic illustration of a furnace system having a charge car, and showing a view of: Charge Car/Table Push/Pull—Rear Handler Push/Pull.

FIG. 18 is a schematic illustration of a furnace system having a charge car, and showing a view of: Charge Car/Table Push/Pull—Rear Handler Push/Pull. In the embodiment shown in FIG. 18, the left side E is a first encoder; the right side E is a second encoder; the left side V is a first VFD controlled gearmotor; the right side V is a second VFD controlled gearmotor; 1 shows the Load Position; 2 shows the Vestibule Load Position; 3 shows the Furnace Position; 4 shows the Vestibule Position after unloading furnace; and, 5 shows the Unload Position.

Figure 19:
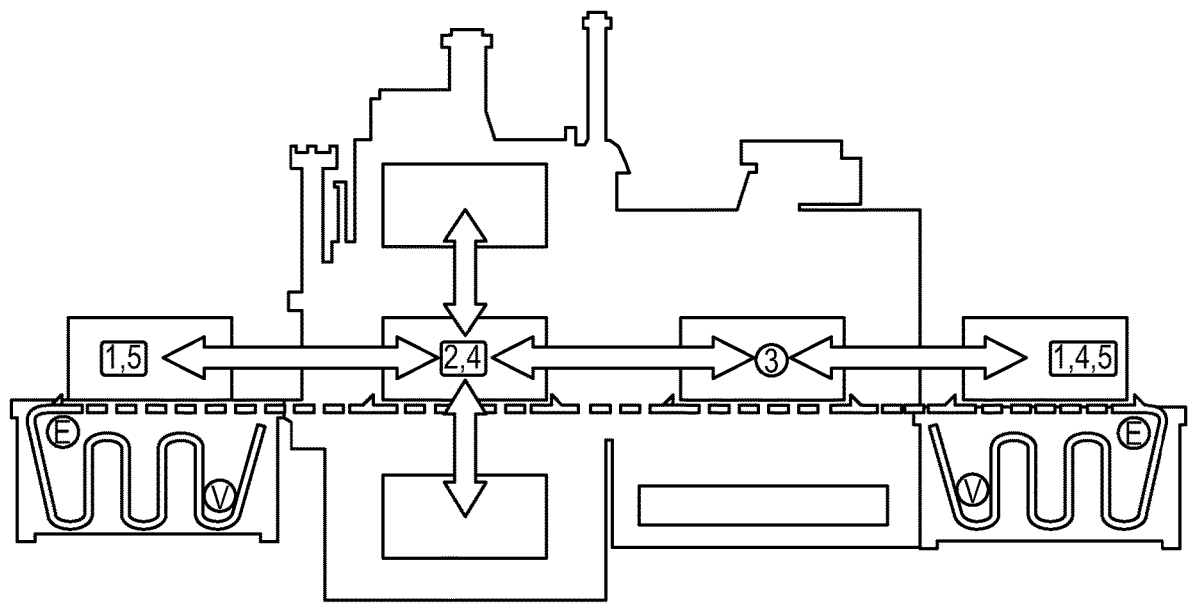
FIG. 19 is a schematic illustration of a furnace system having a charge car, and showing a view of: from Front Car/Table or Rear Load/Unload Push/Pull.

FIG. 19 is a schematic illustration of a furnace system having a charge car, and showing a view of: from Front Car/Table or Rear Load/Unload Push/Pull. In the embodiment shown in FIG. 19, the left side E is a first encoder; the right side E is a second encoder; the left side V is a first VFD controlled gearmotor; the right side V is a second VFD controlled gearmotor; 1 shows the Load Position; 2 shows the Vestibule Load Position; 3 shows the Furnace Position; 4 shows the Vestibule Position after unloading furnace, or Unload Position with a straight-thru operation; and, 5 shows the Unload Position.

EXAMPLES

Tests of a torque-limiting drive charge car were conducted using a typical charge car setup and typical load weights. Multiple trials were run with multiple different loading and torque-limiting drive settings. The car positions loaded accurately. FIGS. 5-12 show various data collected from these tests. Specifically, FIGS. 5, 7, 9, and 11 show output current as a function of charge car position, and FIGS. 6, 8, 10, and 12 show output current as a function of time. The data shows there is an approximately linear correlation between torque and load weight for the test conditions. The required torque to push and pull a 7,000 lbs load is much less than the established handler driveshaft torque rating for the test conditions. The difference between required torque and torque rating provides a reasonable factor for adverse operating conditions.

Jam situations were simulated. A blockage was welded on top of the chain guide on one of the tables. The handler head was driven into the blockage. No tray or load was being carried by the handler head. The data collected were useful for determining the torque limiting drive ratings. Jams were cleared without having to change the torque limiting drive settings.

Figure 20:
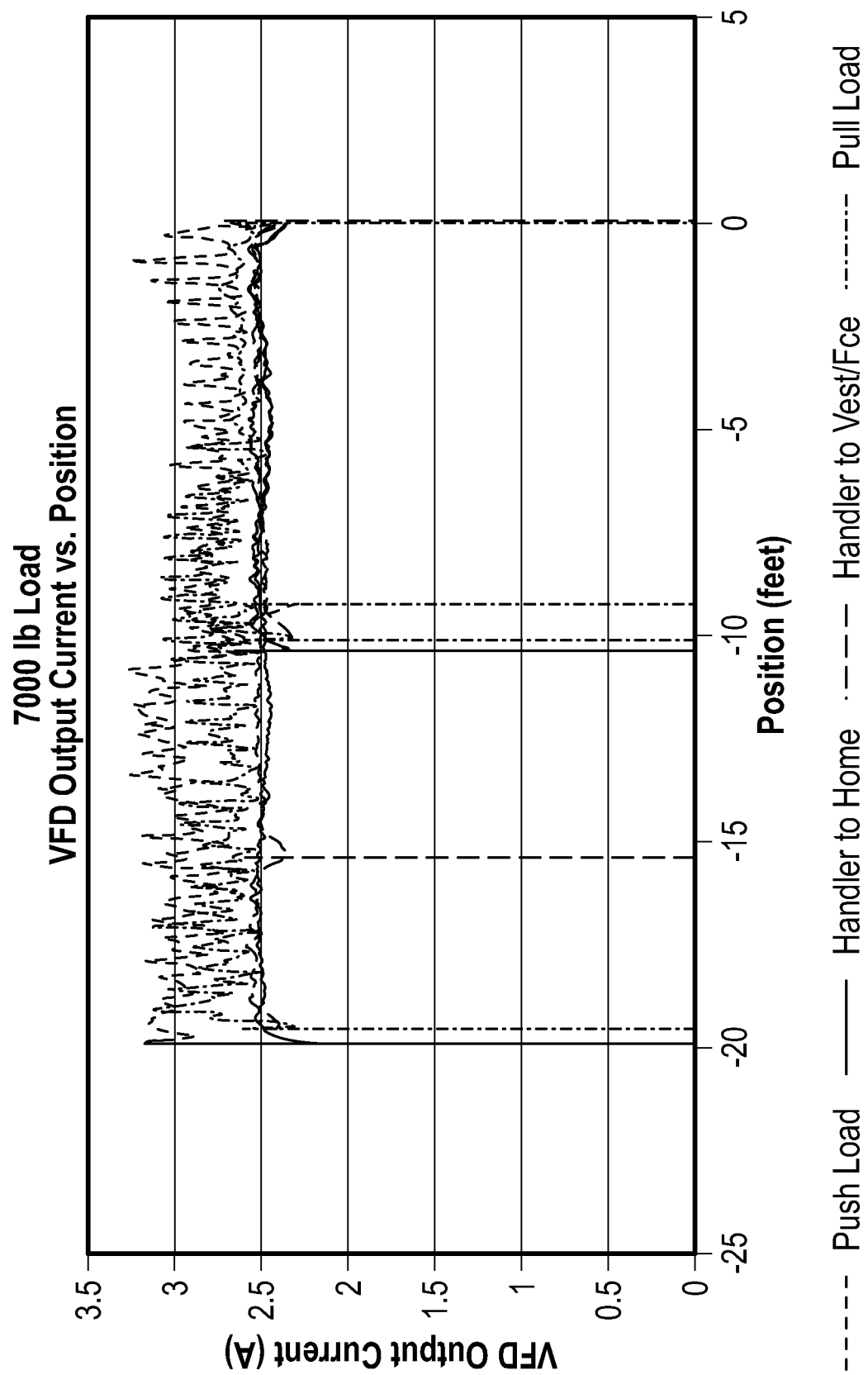
FIG. 20 is a graph showing the VFD output current vs. position for: push load (blue); handler to home (red); handler to Vest/Fce (green); and, pull load (purple).

FIG. 20 is a graph showing the VFD output vs. position for: push load; handler to home; handler to Vest/Fce; and, pull load.

Figure 21:
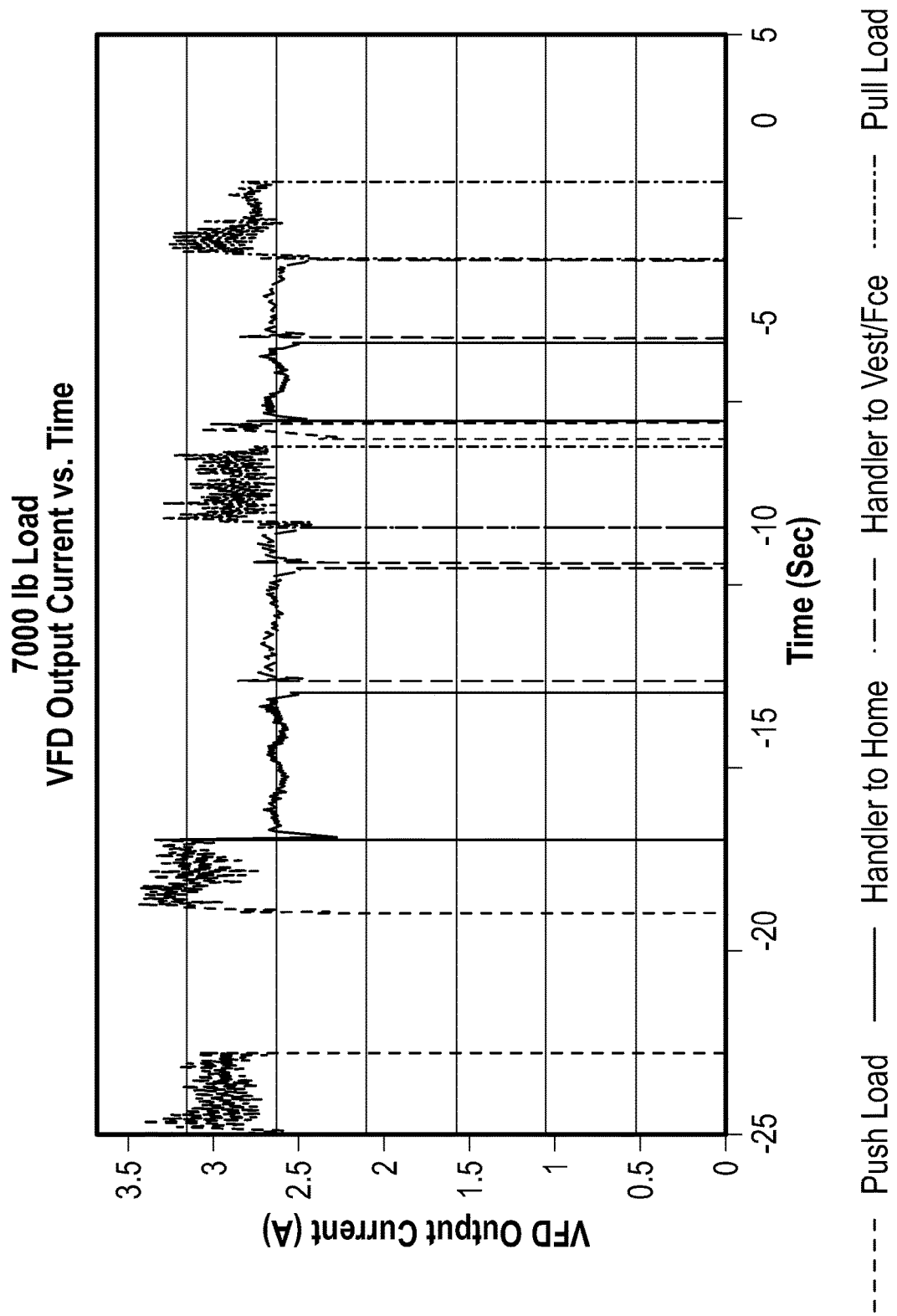
FIG. 21 is a graph showing the VFD output current vs. time for: push load (blue); handler to home (red); handler to Vest/Fce (green); and, pull load (purple).

FIG. 21 is a graph showing the VFD output vs. time for: push load; handler to home; handler to Vest/Fce; and, pull load.

Certain embodiments of the systems, devices, and methods disclosed herein are defined in the above examples. It should be understood that these examples, while indicating particular embodiments of the invention, are given by way of illustration only. From the above discussion and these examples, one skilled in the art can ascertain the essential characteristics of this disclosure, and without departing from the spirit and scope thereof, can make various changes and modifications to adapt the compositions and methods described herein to various usages and conditions. Various changes may be made and equivalents may be substituted for elements thereof without departing from the essential scope of the disclosure. In addition, many modifications may be made to adapt a particular situation or material to the teachings of the disclosure without departing from the essential scope thereof.

What is claimed is:

1. A method for controlling a load-moving system for a heat treating furnace, comprising:
   i) detecting and transmitting a signal and a position of a load-moving system as the load-moving system traverses a plurality of positions into, in, and out of the heat treating furnace;
   wherein the signal being detected comprising one or more of: current, torque, or power used by the load-moving system at a determined position and/or time;
   ii) establishing a baseline of signals detected;
   iii) determining a maximum signal for each position; and
   iv) comparing the maximum signal for each position to a predetermined threshold signal;
      wherein the system suggests maintenance if the maximum signal for a position is greater than, or equal to, the predetermined threshold signal
   v) trending the baseline over time; and,
   vi) recommending inspecting, repairing, and/or replacing a furnace aspect when the detected signals data surpasses a predetermined threshold value;
   wherein the maximum signal for the position is appended to a maximum signal trend, and the method further comprising:
   vii) regressing the maximum signal trend over time;
   viii) extrapolating the regression to determine a time intercept with the predetermined threshold signal; and
   ix) calculating time to service by subtracting a current time from the determined time intercept, wherein the system updates time to service if the calculated time to service is greater than, or equal to, a stored time to service.

2. The method of claim 1, wherein the furnace aspect comprises one or more of a furnace alloy, alignment of an elevator, and a furnace/vestibule threshold.

3. The method of claim 1, wherein a trend mode is set on the load-moving system.

4. The method of claim 3, wherein the trend mode is selected from the group consisting of in with load, out with load, in without load, and out without load.

5. The method of claim 1, wherein the load-moving system is selected from the group consisting of a charge car, a rear handler, a charge table, and an elevator.

6. The method of claim 1, wherein the load-moving system comprises a torque-limiting drive.

7. A method for controlling a load-moving system for a heat treating furnace, comprising:
   i) detecting and transmitting a signal and a position of a load-moving system as the load-moving system traverses a plurality of positions into, in, and out of the heat treating furnace;
   wherein the signal being detected comprising one or more of: current, torque, or power used by the load-moving system at a determined position and/or time:
   ii) establishing a baseline of signals detected;
   iii) determining a maximum signal for each position; and
   iv) comparing the maximum signal for each position to a predetermined threshold signal;
   wherein the system suggests maintenance if the maximum signal for a position is
   greater than, or equal to, the predetermined threshold signal
   v) trending the baseline over time;
   wherein a trend mode is set on the load-moving system and,
   vi) recommending inspecting, repairing, and/or replacing a furnace aspect when the detected signals data surpasses a predetermined threshold value:
   wherein the maximum signal for each position is appended to a maximum signal trend for the trend mode, and the method further comprises:
   vii) regressing the maximum signal trend for the trend mode over time;
   viii) extrapolating the regression to determine an extrapolated time intercept with the predetermined threshold signal; and
   ix) calculating time to service by subtracting a current time from the extrapolated time intercept, wherein the system updates time to service if the calculated time to service is greater than, or equal to, a stored time to service.

8. A method for controlling a load-moving system comprising:
   reading a signal and a position of a load-moving system as the load-moving system traverses a plurality of positions, wherein the signal is at least one of current, torque, or power used by the load-moving system at the position:
   appending a signal vector from the signals read to a signal trend;
   regressing the signals read at each position versus time to produce a regression line;
   extrapolating the regression line for each position to find a time intercept with a predetermined threshold signal; and
   calculating the time to service for each position by subtracting a current time from the determined time intercept, wherein the system updates the time to service at a given position if the calculated time to service at the position is greater than, or equal to, a stored time to service for the position; and,
   recommending maintenance at a position if the signal at the position exceeds a predetermined threshold signal.

9. The method of claim 8, further comprising a step of reading a trend mode before reading the signal and the position.

10. The method of claim 9, wherein the trend mode is selected from the group consisting of in with load, out with load, in without load, and out without load.

11. The method of claim 8, wherein the load-moving system is selected from the group consisting of a charge car, a rear handler, a charge table, and an elevator.

12. The method of claim 8, wherein the load-moving system comprises a torque-limiting drive.

13. A method for controlling a load-moving system comprising:
reading a signal and a position of a load-moving system as the load-moving system traverses a plurality of positions, wherein the signal is at least one of current, torque, or power used by the load-moving system at the position; and
appending a signal vector from the signals read to a signal trend for a trend mode;
regressing the signals read at each position for the trend mode versus time to produce a regression line;
extrapolating the regression line for each position for the trend mode to determine a time intercept with a predetermined threshold signal; and
calculating time to service for each position by subtracting current time from the determined time intercept at each position, wherein the system updates time to service for a given position if the calculated time to service for the position is greater than, or equal to, a stored time to service for the position; and,
recommending maintenance at a position if the signal at the position exceeds a
predetermined threshold signal;
the method further comprising a step of reading a trend mode before reading the signal and the position.

14. A load-moving system comprising:
a charge car having a receptacle configured to carry a load, a handler drive motor, and a lateral motor;
a torque-limiting drive adapted to control the handler drive motor;
a variable speed drive adapted to control the lateral motor;
an encoder configured to sense movement; and
a programmable logic controller capable of shutting off the handler drive motor which is configured to:
i) detect and transmit a signal and a position of the load-moving system as the load-moving system traverses a plurality of positions into, in, and out of a heat treating furnace;
wherein the signal being detected comprising one or more of: current, torque, or power used by the load-moving system at a determined position and/or time;
ii) establish a baseline of signals detected;
iii) determine a maximum signal for each position; and
iv) compare the maximum signal for each position to a predetermined threshold signal;
wherein the system suggests maintenance if the maximum signal for a position is greater than, or equal to, the predetermined threshold signal:
v) trend the baseline over time; and,
vi) recommend inspecting, repairing, and/or replacing a furnace aspect when the detected signals data surpasses a predetermined threshold value:
wherein the maximum signal for the position is appended to a maximum signal trend, and the programmable logic controller is further configured to:
vii) regress the maximum signal trend over time;
viii) extrapolate the regression to determine a time intercept with the predetermined threshold signal; and,
ix) calculate time to service by subtracting a current time from the determined time intercept,
wherein the system updates time to service if the calculated time to service is greater than, or equal to, a stored time to service.

15. The load-moving system of claim 14, wherein the programmable logic controller comprises a human-machine interface that presents processed data to a user.

16. The load-moving system of claim 14, further comprising a laser apparatus configured to laser-align the charge car with a piece of furnace equipment.

17. The load-moving system of claim 14, further comprising an electronic safety bumper on the charge car.

18. The load-moving system of claim 14, adapted to store or send data by Wi-Fi or an Ethernet connection.

19. A furnace system comprising:
a furnace chamber; and
a load-moving system comprising:
a charge car having a receptacle configured to carry a load, a handler drive motor, and a lateral motor;
a torque-limiting drive adapted to control the handler drive motor;
a variable speed drive adapted to control the lateral motor;
an encoder configured to sense movement; and
a programmable logic controller capable of shutting off the handler drive motor which is configured to:
i) detect and transmit a signal and a position of the load-moving system as the load-moving system traverses a plurality of positions into, in, and out of a heat treating furnace;
wherein the signal being detected comprising one or more of: current, torque, or power used by the load-moving system at a determined position and/or time;
ii) establish a baseline of signals detected;
iii) determine a maximum signal for each position; and
iv) compare the maximum signal for each position to a predetermined threshold signal;
wherein the system suggests maintenance if the maximum signal for a position is greater than, or equal to, the predetermined threshold signal:
v) trend the baseline over time; and,
vi) recommend inspecting, repairing, and/or replacing a furnace aspect when the detected signals data surpasses a predetermined threshold value:
wherein the maximum signal for the position is appended to a maximum signal trend, and the programmable logic controller is further configured to:
vii) regress the maximum signal trend over time;
viii) extrapolate the regression to determine a time intercept with the predetermined threshold signal; and,
ix) calculate time to service by subtracting a current time from the determined time intercept,
wherein the system updates time to service if the calculated time to service is greater than, or equal to, a stored time to service.

20. The furnace system of claim 19, wherein the load-moving system is configured to recommend maintenance to the furnace chamber based on the signals read by the load-moving system.

* * * * *